United States Patent [19]
Onodera et al.

[11] Patent Number: 5,898,855
[45] Date of Patent: Apr. 27, 1999

[54] CONTROL METHOD FOR VIRTUAL MACHINE RUNNING TIME IN VIRTUAL MACHINE SYSTEM

[75] Inventors: Osamu Onodera, Hadano; Ken Uehara, Isehara, both of Japan

[73] Assignee: Hitachi, Ltd., Tokyo, Japan

[21] Appl. No.: 08/309,407

[22] Filed: Sep. 20, 1994

[30]   Foreign Application Priority Data

Sep. 20, 1993   [JP]   Japan .................................. 5-232839

[51] Int. Cl.⁶ ...................................................... G06F 9/40
[52] U.S. Cl. .............................................. 395/406; 711/6
[58] Field of Search .................................. 395/650, 700, 395/406, 677, 678, 406 R; 711/6

[56]       References Cited

U.S. PATENT DOCUMENTS

| | | | |
|---|---|---|---|
| 4,564,903 | 1/1986 | Guyette et al. | 364/300 |
| 4,835,685 | 5/1989 | Kun | 395/650 |
| 4,949,254 | 8/1990 | Shorter | 395/700 |
| 5,003,466 | 3/1991 | Schan, Jr. et al. | 395/183.17 |
| 5,047,925 | 9/1991 | Kun et al. | 395/200.01 |
| 5,063,500 | 11/1991 | Shorter | 395/200 |
| 5,095,427 | 3/1992 | Tanaka et al. | 395/406 |
| 5,201,049 | 4/1993 | Shorter | 395/650 |
| 5,361,375 | 11/1994 | Ogi | 395/406 R |
| 5,408,617 | 4/1995 | Yoshida | 395/325 |
| 5,506,975 | 4/1996 | Onodera | 395/406 |
| 5,574,878 | 11/1996 | Onodera et al. | 395/417 |

FOREIGN PATENT DOCUMENTS 6-187178   7/1994   Japan .

OTHER PUBLICATIONS

Eglowstein, et al., "Reviews", BYTE, vol. 14, No. 9, pp(16), Sep. 1989.

IBS Systems Journal, vol. 28, No. 1, 1989, Armonk, NY, US, pp. 104–122, X–000046164.

T.L. Borden et al.: "Multiple operating systems on one processor complex" *the whole document*.

Patent Abstracts of Japan, vol. 18, No. 536 (P–1811, Oct. 12, 1994 & JP–A–06 187178 (Hitachi Ltd.),m Jul. 8, 1994) *abstract*.

*Primary Examiner*—Lucien U. Toplu
*Assistant Examiner*—St. John Courtenay, III
*Attorney, Agent, or Firm*—Antonelli, Terry, Stout & Kraus, LLP

[57]            ABSTRACT

A virtual machine system capable of considerably improving its performance by preventing a variation of time slice values of logical processors and strictly ensuring the concurrent running of a plurality of logical processors belonging to the same virtual machine, in the configuration and management of virtual machines of a multi-processor structure having a plurality of logical processors. A method of controlling a virtual machine running time in the virtual machine system includes collectively storing time slice values of logical processors in a virtual machine to which the logical processors belong, and making a virtual machine control program for supervising and controlling the logical processors to store and manage the time slice values.

1 Claim, 7 Drawing Sheets

CONTROL METHOD FOR VIRTUAL MACHINE RUNNING TIME IN VIRTUAL MACHINE SYSTEM

BACKGROUND OF THE INVENTION

1. Field of the Invention

The present invention relates to an information processing system such as a virtual machine system, and more particularly to a method of controlling a running time of a virtual machine in a virtual machine system.

2. Description of the Related Art

An information processing system called a virtual machine system has been realized recently, and its operation mode is being generalized. A virtual machine system configures an information processing system by providing a plurality of virtual machines under a single real machine. A virtual machine control program (hereinafter called VMCP) runs on a real machine and an operating system (hereinafter called OS) runs under the control of VMCP. In general, as an operation mode of a computer constituting an information processing system, there are a method which runs a single OS on a single real machine and a method called a virtual machine (hereinafter called VM or LPAR (logically partitioning)) system which runs a plurality of OSs on a single real machine. A mode of running a single OS on a real machine is called a basic mode. Hardware resources of a real machine used by this mode include one or more central processing units (hereinafter called CPU or IP (instruction processor)), one shared main storage (hereinafter called MS), and one or more channel paths (hereinafter called CHP). These hardware resources of the real machine are used collectively as a unit resource. A mode by which a plurality of OSs run on a plurality of LPARs under a single real machine, is called an LPAR mode.

Figure 1:
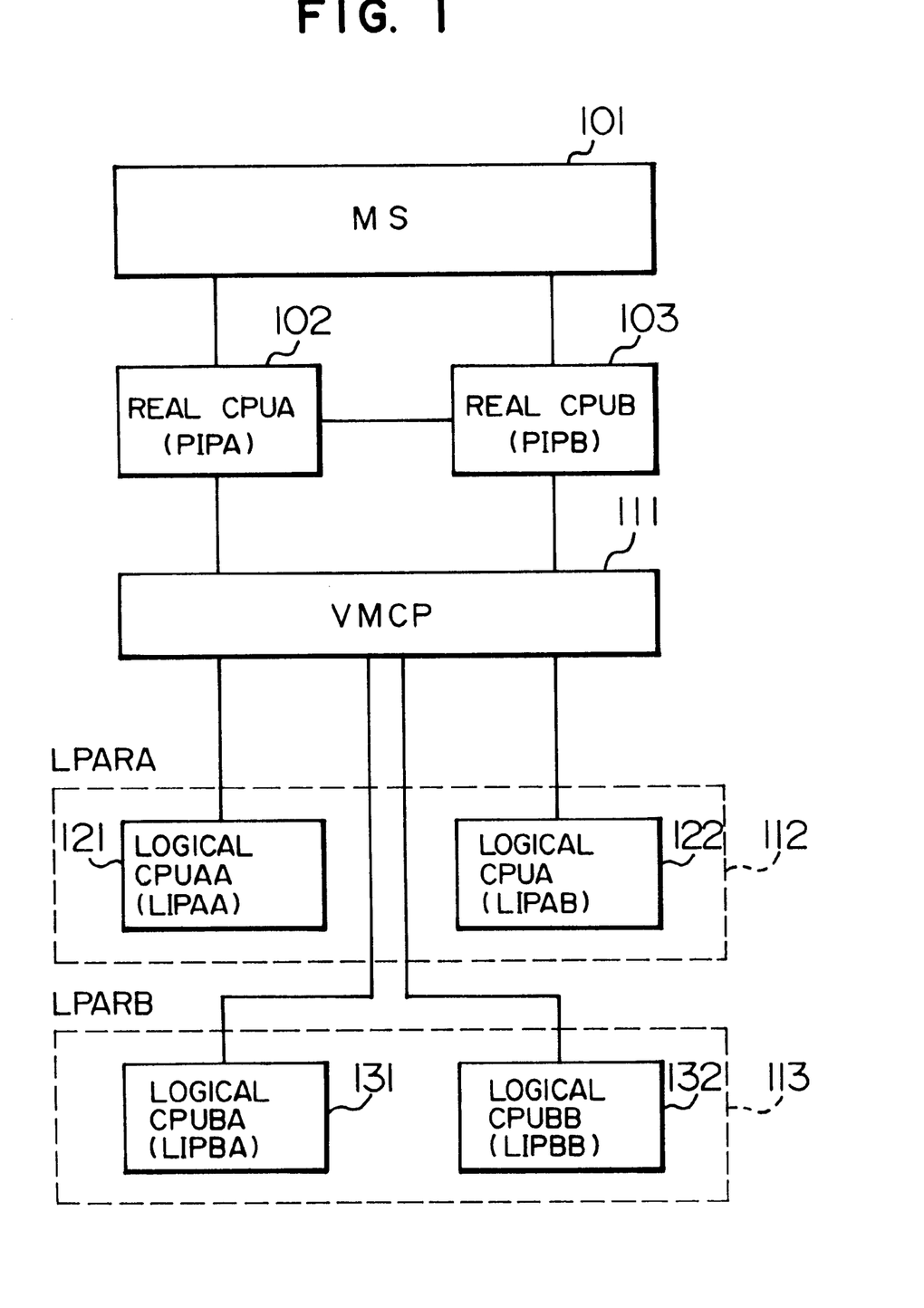
FIG. 1 is a diagram showing the structure of a virtual machine system constituted by a plurality of logical CPUs.

In general, in order to realize a plurality of LPARs under a single real machine, a program called VMCP is executed on the real machine, a plurality of virtual machines LPARs are formed under the control of VMCP, and an independent OS is made to run on each LPAR. Therefore, VMCP has an additional function of causing each LPAR to share the hardware resources of a single real machine. As a method of causing each LPAR to share the hardware resources of a single real machine, there are a method which time divisionally assigns hardware resources under the control of VMCP, a method which logically divides hardware resources and exclusively assigns them to each LPAR, a combined method of the former two methods for assigning hardware resources, and other methods. For example, as a real CPU sharing method, a method which time divisionally assigns a real CPU to each LPAR has been used, and as a method of sharing input/output channels and MS to each LPAR, a method which logically divides real CHPs and MS and exclusively assigns them to each LPAR has been used. A method of time divisionally assigning a real CPU to each LPAR which may be assumed prior to the present invention, but not admitted as prior art will be described with reference to FIGS. 1 and 2. FIG. 1 is a diagram explaining a real CPU sharing method.

Referring to FIG. 1, a real CPU (hereinafter called PIP) is of a multi-processor structure (hereinafter called MP structure) having two PIPs, PIPA 102 and PIPB 103. PIPA 102 and PIPB 103 are connected to MS 101 and also connected to each other, to realize an MP structure. VMCP capable of controlling the MP structure runs on PIPA 102 and PIPB 103. Two LPARs, LPARA 112 and LPARB 113, are formed under the control of VMCP. LPARA 112 and LPARB 113 are each constituted by two logical CPUs (hereinafter called LIP). Specifically, LPARA 112 configures an MP structure made of LIPAA 121 and LIPAB 122, whereas LPARB 113 configures an MP structure made of LIPBA 131 and LIPBB 132. Therefore, an OS running on LPARA 112 controls LIPAA 121 and LIPAB 122, and an OS running on LPARB 113 controls LIPBA 131 and LIPBB 132. LIPAA 121 and LIPBA 131 run only on PIPA 102, and LIPAB 122 and LIPBB 132 run only on PIPB 103.

Figure 2A:
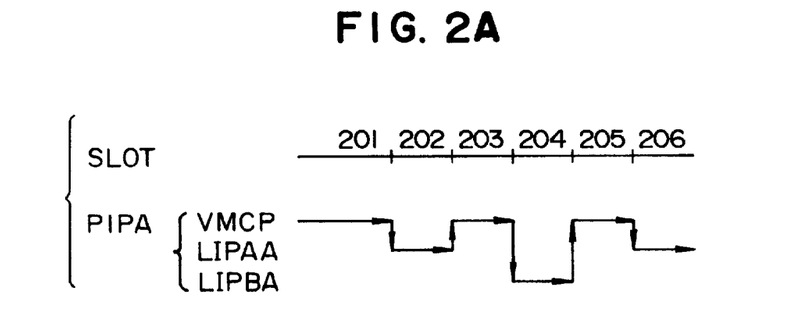
FIG. 2 is a timing chart showing the transition of an operation state of a plurality of logical CPUs according to a conventional technique.
Figure 2B:
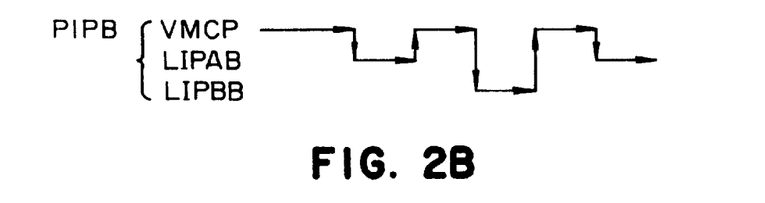

Next, the operation of VMCP and each LPAR running on PIP will be explained. FIG. 2 is a timing chart illustrating how real machine resources are distributed to VMCP. LIPAA 121, LIPBA 131, LIPAB 122, and LIPBB 132 when VMCP and each LPAR are dispatched to PIP. As shown in FIG. 2, real machine resources are assigned to VMCP at slots 201, 203, and 205, to LIPAA 121 and LIPAB 122 at slots 202 and 206, and to LIPBA 131 and LIPBB 132 at a slot 204. In this timing chart, PIPA 102 is fixedly assigned LIPAA 121 and LIPBA 131, whereas PIPB 103 is fixedly assigned LIPAB 122 and LIPBB 132.

Slot 201: At the slot 201, VMCP running on PIPA 102 and PIPB 103 sets an operation termination time of LIPAA 121 and LIPAB 122 to internal timers of PIPA 102 and PIPB 103 by using a time slice value (hereinafter called TIMSLC) stored in LPARA 112 for defining a running time of LIPAA 121 and LIPAB 122, and thereafter activates LIPAA 121 and LIPAB 122 to run on PIPA 102 and PIPB 103. At this point, the operations of PIPA 102 and PIPB 103 are moved to a slot 202.

Slot 202: At the slot 202, LIPAA 121 and LIPAB 122 operate while updating the internal timers set at the slot 201 by using TIMSLC. When it becomes the operation termination time of LIPAA 121 and LIPAB 122, the operations thereof are terminated by a timer interrupt to VMCP, and the control is transferred to VMCP. At the time when the control is transferred to VMCP, the operations of PIPA 102 and PIPB 103 are moved to a slot 203.

Slot 203: At the slot 203, similar to the time slot 201, VMCP running on PIPA 102 and PIPB 103 sets an operation termination time of LIPBA 131 and LIPBB 132 to the internal timers of PIPA 102 and PIPB 103 by using TIMSLC stored in LPARB 113 which defines a running time of LIPBA 131 and LIPBB 132, and thereafter activates LIPBA 131 and LIPBB 132 to run on PIPA 102 and PIPB 103. At this point, the operations of PIPA 102 and PIPB 103 are moved to a slot 204.

Slot 204: At the slot 204, similar to the slot 202, LIPBA 131 and LIPBB 132 operate while updating the internal timers set at the slot 203 by using TIMSLC. When it becomes the operation termination time of LIPBA 131 and LIPBB 132, the operations thereof are stopped by a timer interrupt to VMCP, and the control is transferred to VMCP. At the time when the control is transferred to VMCP, the operations of PIPA 102 and PIPB 103 are moved to a slot 205.

Slot 205: The operation at the slot 205 is similar to the slot 201. VMCP activates LIPAA 121 and LIPAB 122 to run on PIPA 102 and PIPB 103, and the operations of PIPA 102 and PIPB 103 are moved to a slot 206.

The operations similar to the above operations are repeated thereafter to time divisionally run LPARA 112 and LPARB 113 on PIPA 102 and PIPB 103. As appreciated from the foregoing description, a time divisional operation of a plurality of LIPs on a single PIP can be realized by the control of VMCP and by using TIMSLC. The conventional technique explained with FIG. 2 assumes that a plurality of LIPs belonging to one LPAR are synchronously activated at the same time. However, in practice, a plurality of LIPs belonging to one LPAR are rarely activated synchronously at the same time, but they are activated randomly, because interrupts other than the timer interrupt occur or some LIPs enter a standby state.

Figure 3:
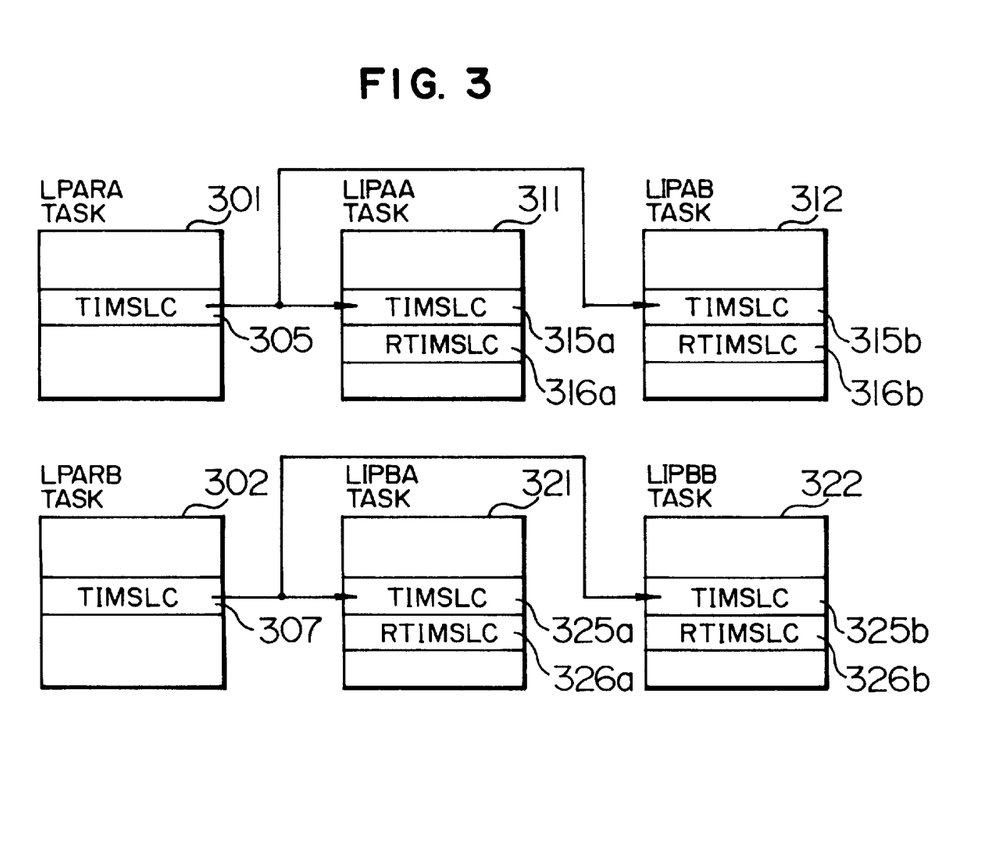
FIG. 3 is a diagram showing the control structure of a virtual machine system constituted by a plurality of logical CPUs according to a conventional technique.

FIG. 3 shows the relationship between LPARA 112, LPARB 113, LIPAA 121, LIPAB 122, LIPBA 131, and LIPBB 132, respectively shown in FIG. 2 and generated by VMCP in a software manner. The former two LPARs and latter four LIPs are generated and controlled as tasks. Specifically, VMCP generates an LPARA task 301, an LPARB task 302, an LIPAA task 311, an LIPAB task 312, an LIPBA task 321, and an LIPBB task 322, respectively for LPARA 112, LPARB 113, LIPAA 121, LIPAB 122, LIPBA 131, and LIPBB 132. VMCP generates the two LPAR tasks when LPAR definition parameters are inputted from an external device, and generates the four LIP tasks when LIP definition parameters and commands are inputted from the external device in correspondence with the two LPARs. TIMSLC for each LPAR is contained in the LPAR definition parameters, and stored in a task control block of each LPAR task when the LPAR definition parameters are inputted. In FIG. 3, TIMSLC for the LPARA task 301 is TIMSLC 305, and TIMSLC for the LPARB task 302 is TIMSLC 307. TIMSLC for each LIP is contained in the LPAR definition parameters and commands, and stored in a task control block of each LIP task when the LPAR definition parameters and commands are inputted. In FIG. 3, TIMSLC 305 for the LPARA task 301 is transferred to a task control block of the LIPAA task 311 as TIMSLC 315a and to a task control block of the LIPAB task 312 as TIMSLC 315b, when the LIP definition parameters and commands are inputted. TIMSLC 307 for the LPARB task 302 is transferred to a task control block of the LIPBA task 321 as TIMSLC 325a and to a task control block of the LIPBB task 322 as TIMSLC 325b, when the LIP definition parameters and commands are inputted. In FIG. 3, the value of RTIMSLC 316a in a task control block of the LIPAA task 311 indicates the time allowing the LIPAA task 311 to run on PIPA 102. The initial value of this value is the same as TIXSLC 315a. The running time from when the LIPAA task 311 is activated to run on PIPA 102 to when the control is transferred to VMCP because of an interrupt or interception, is subtracted from the value of RTIMSLC 316a, and the result is again stored in the area of RTIMSLC 316a. That is to say, the value of RTIMSLC 316a indicates the residual running time of the time slice assigned to the LIPAA task 311. The LIPAA task 311 can run on PIPA until the value of RTIMSLC 316a becomes "0". When the value of RTIMSLC 316a becomes "0", the LIPAA task 311 stops running on PIPA 102 under the control of VMCP until the values of RTIMSLCs of all other LIP tasks become "0". When the values of RTIMSLCs of all other LIP tasks become "0", the value of TIMSLC 315a in the task control block of the LIPAA task 311 is set to RTIMSLC 316a to initialize the latter. The LIPAA task 311 stopped its running again starts running on PIPA 102 under the control of VMCP, by using the initialized RTIMSLC 316a. The same function of RTIMSLC 316a of the LIPAA task 311 is assigned also to RTIMSLC 316b of LIPAB 122, RTIMSLC 326a of LIPBA 131, and RTIMSLC 326b of LIPBB 132.

Figure 4A:
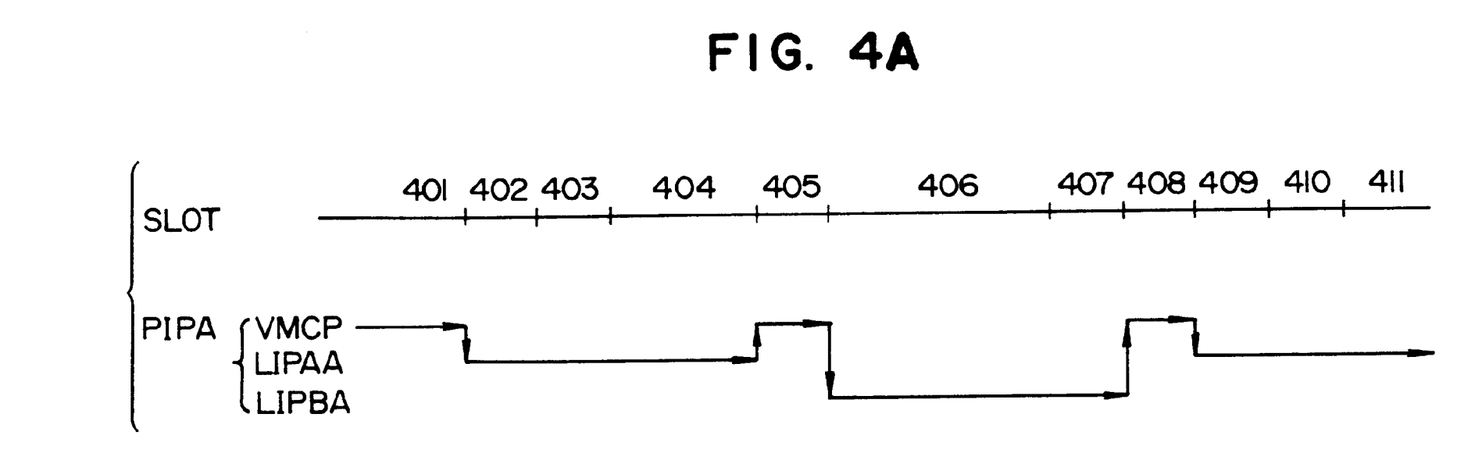
FIG. 4 is a timing chart showing the transition of an operation state of a plurality of logical CPUs according to a conventional technique.
Figure 4B:
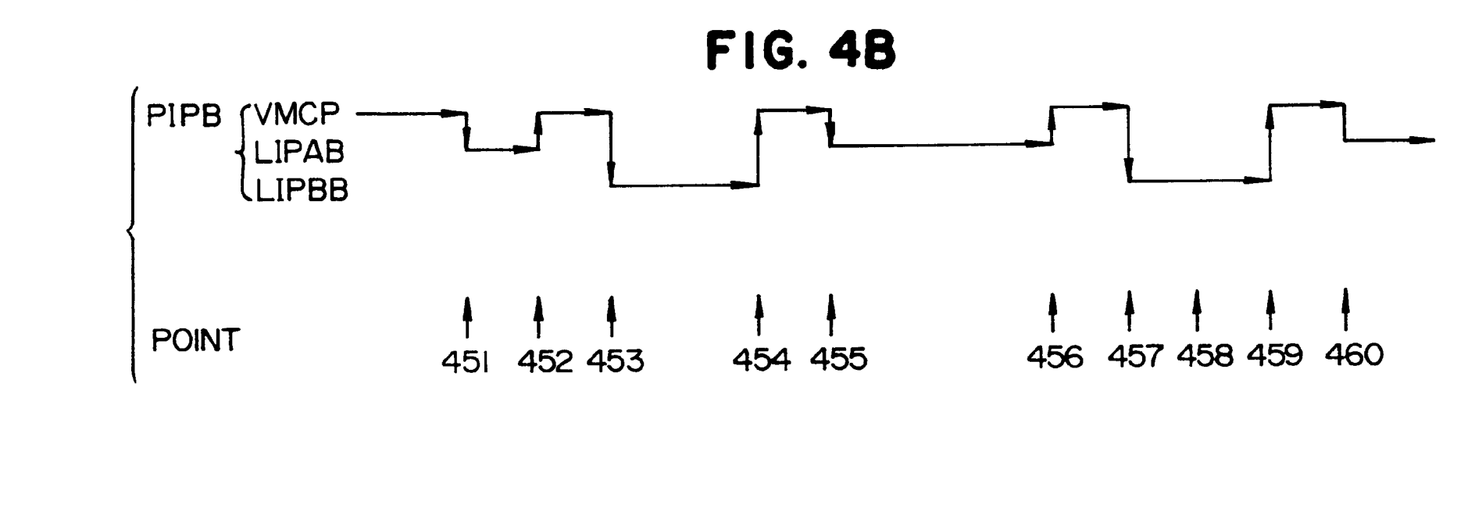

Referring next to FIG. 4, the running states of VMCP, LIPAA, LIPAB, LIPBA, and LIPBB will be described time sequentially. FIG. 4 is a timing chart illustrating a distribution of real machine resources to VMCP, LIPAA task 311, LIPAB task 312, LIPBA task 321, and LIPBB task 322 when VMCP and each LIP are dispatched to and run on PIP. In this timing chart, the LIPAA task 311 and LIPBA task 321 are fixedly assigned to PIPA, and the LIPAB task 321 and LIPBB task 322 are fixedly assigned to PIPB.

Slot 401: VMCP running on PIPA and PIPB at the slot 401 has already transferred TIMSLC 305 stored in the LPARA task 301 to the LIPAA task 311 as TIMSLC 315a and to the LIPAB task 312 as TIMSLC 315b. Similarly, VMCP has already transferred TIMSLC 307 stored in the LPARB task 302 to the LIPBA task 321 as TIMSLC 325a and to the LIPBB task 322 as TIMSLC 325b. Furthermore, RTIMSLC 316a of the LIPAA task 311 has been initialized to TIMSLC 315a, RTIMSLC 316b of the LIPAB task 312 has been initialized to TIMSLC 315b, RTIMSLC 326a of the LIPBA task 321 has been initialized to TIMSLC 325a, and RTIMSLC 326a of the LIPBB task 322 has been initialized to TIMSLC 325a. VMCP sets the running termination times RTIMSLC 316a and RTIMSLC 316b of the LIPAA task 311 and LIPAB task 312 to the internal timers of PIPA and PIPB, and thereafter, activates the LIPAA task 311 and LIPAB task 312 to run on PIPA and PIPB (at point 451). At this point, the operations of PIPA and PIPB are moved to a slot 402.

Slot 402: At the slot 402, the LIPAA task 311 and LIPAB task 312 run while the internal timers of PIPA and PIPB set at the slot 401 are being updated. During the running of the LIPAB task 312 on PIPB, if an event such as an interrupt other than the timer interrupt indicating an end of the operation termination time (hereinafter called a time slice end or TSEND), interception, and LIP standby is issued to the LIPAB task 312 running on PIPB, the operation thereof is stopped, and the control is transferred to VMCP (at point,452). At this point 452, the operation of the LIPAA task 311 running on PIPA continues. When the control of PIPB is transferred to VMCP, the operations of PIPA and PIPB are moved to a slot 403.

Slot 403: At the slot 403, VMCP running on PIPB stores an updated value of the internal timer of PIPB set at the slot 401 in the LIPAB task 312 as RTIMSLC 316b. The stored value of RTIMSLC 316b indicates the residual time of the operation termination time of the LIPAB task 312. At the slot 403, similar to the slot 401, VMCP sets the operation termination time RTIMSLC 326b of the LIPBB task 322 to the internal timer of PIPB, and thereafter activates the LIPBB task 322 to run on PIPB (at point 453). At this point, the operations of PIPA and PIPB are moved to a slot 404.

Slot 404: At the slot 404, the operation of the LIPAA task 311 running on PIPA from the slot 402 continues, and the LIPBB task 322 starts running on PIPB. During the execution at the slot 404, if an event such as an interrupt other than the timer interrupt of TSEND, interception, and LIP standby is issued to the LIPBB task 322 running on PIPB, the operation thereof is stopped, and the control is transferred to VMCP. At the same time, when it becomes the operation termination time of the LIPAA task 311 running on PIPA, the operation of the LIPAA task 311 is stopped in response to the timer interrupt of TSEND, and the control is transferred to VMCP (at point 454). When the control is transferred to VMCP, the operations of PIPA and PIPB are moved to a slot 405.

Slot 405: At the slot 405, VMCP sets the operation termination times RTIMSLC 326a and RTIMSLC 316b of the LIPBA task 321 and LIPAB task 312 to the internal timers of PIPA and PIPB. In this example, the LIPBA task 321 running on PIPA at its preceding slot has been stopped in response to the timer interrupt of TSEND. Therefore, TIMSLC 325a is set as RTIMSLC 326a. Also because the LIPAB 312 running on PIPB at its preceding slot has been stopped not in response to the timer interrupt of TSEND, the residual time of the operation termination time of the LIPAB task 312 stored at the slot 403 is used as it is. Thereafter, the LIPBA task 321 and LIPAB task 312 are activated to run on PIPA and PIPB (at point 455). At this point, the operations thereof are moved to a slot 406.

Slot 406: During the execution at the slot 406, when it becomes the operation termination time of the LIPAB task 312 running on PIPB, the operation thereof is stopped in response to the timer interrupt of TSEND issued to VMCP, and the control is transferred to VMCP (at point 456). At this point, the operation of the LIPBA task 321 running on PIPB continues. When the control of PIPB is transferred to VMCP, the operations of PIPA and PIPB are moved to a slot 407.

Slot 407: At the slot 407, VXCP running on PIPB stores an updated value of the internal timer of PIPB set at the slot 405 in the LIPAB task 312 as RTIMSLC 316b. The value of this stored RTIMSLC 316b indicates the residual time of the operation termination time of the LIPAB task 312. However, in this example, because the operation of the LIPAB task 312 has been stopped in response to the timer interrupt of TSEND, the value is zero or a negative value. At the slot 407, similar to the slot 403, VMCP sets the operation termination time RTIMSLC 326b of the LIPBB task 322 to the internal timer of PIPB. In this example, the LIPBB task 322 running on PIPB at its preceding slot has been stopped not in response to the timer interrupt of TSEND. Therefore, the residual time of the operation termination time of the LIPBB task 322 stored at the slot 403 is used as RTIMSLC 326b. Thereafter, the LIPBB task 322 is activated to run on PIPB. At the same time, when it becomes the operation termination time of the LIPBA task 321 running on PIPA, the operation of the LIPBA task 321 is stopped in response to the timer interrupt of TSEND, and the control is transferred to VMCP (at point 457). At this point, the operations of PIPA and PIPB are moved to a slot 408.

Slot 408: At the slot 408, VMCP sets the operation termination time RTIMSLC 316a of the LIPAA task 311 to the internal timer of PIPA. In this example, the LIPAA task 311 running on PIPA at the preceding slot has been stopped in response to the timer interrupt of TSEND. Therefore, TIMSLC 315a is set as RTIMSLC 316a. Thereafter, the LIPAA task 311 is activated to run on PIPA (at point 458). At this point, the operations of PIPA and PIPB are moved to a slot 409.

Slot 409: During the execution at the slot 409, when it becomes the operation termination time of the LIPBB task 322 running on PIPB, the operation of the LIPBB task 322 is stopped in response to the timer interrupt of TSEND issued to VMCP, and the control is transferred to VMCP (at point 459). At this point, the operation of VMCP running on PIPA continues. When the control of PIPB is transferred to VMCP, the operations of PIPA and PIPB are moved to a slot 410.

Slot 410: At the slot 410, VMCP running on PIPB stores an updated value of the internal timer set at the slot 405 in the LIPAB task 312 as RTIMSLC 316a. The value of this stored R 316b indicates the residual time of the operation termination time of the LIPAB task 312. However, in this example, because the operation of the LIPAB task 312 has been stopped in response to the timer interrupt of TSEND, the value is zero or a negative value. Also because the operation of the LIPAB task 312 running on PIPB at the preceding slot has been stopped in response to the timer interrupt of TSEND, TIMSLC 315b is set as TIMSLC 316b. Thereafter, the LIPAB task 312 is activated to run on PIPB (at point 460). At this point, the operations of PIPA and PIPB are moved to a slot 411.

After the slot 411, the LIPAA task 311, LIPAB task 312, LIPBA task 321, and LIPBB task 322 alternately run on PIPA and PIPB under the control of VMCP in accordance with the procedure explained with the slots 401 to 410.

As shown in FIG. 4, according to the conventional technique, the LIPAA task 311 and LIPAB task 312 constituting a multi-processor structure and belonging to the LPARA task 301 run at the same time only at the slots 402 and 411, and the LIPBA task 321 and LIPBB task 322 constituting a multi-processor structure and belonging to LPARB task 302 do not run at the same time on PIPA and PIPB. This is because each LIP task manages its RTIMSLC and the timing of TSEND at each LIP task becomes greatly different. This means that the above-mentioned technique does not strictly ensure that a plurality of LIP tasks run at the same time on a plurality of PIPs in the configuration and management of a VM of a multi-processor structure having a plurality of LIP tasks. It is desirable to strictly ensure that a plurality of LIP tasks run at the same time on a plurality of PIPS. The reason for this is that an OS running on a VM of a multi-processor structure having a plurality of LIP tasks uses a multi-processor control instruction and interrupt function while taking the characteristics of a multi-processor into consideration. For example, if a LIP task (a first LIP task) issues a multi-processor control instruction to another LIP task (a second LIP task) and if the second LIP task is not running on the corresponding PIP, the multi-processor control instruction issued by the first LIP task cannot be completed so that the OS running on the first LIP task enters a standby state until the second LIP task becomes active or the control is transferred to VMCP. An occurrence of such an event that the OS running on the first LIP task enters a standby state until the second LIP task becomes active or the control is transferred to VMCP, results in an overhead of the OS running on the first LIP task and a delayed response of the OS. This overhead causes degraded performance of VM.

According to the above-discussed technique, it is not possible to strictly ensure that a plurality of LIP tasks run at the same time on a plurality of PIPs in the configuration and management of a VM of a multi-processor structure having a plurality of LIP tasks. As a result, if an OS running on a VM of a multi-processor structure having a plurality of LIP tasks uses a multi-processor control instruction and interrupt function while taking the characteristics of a multi-processor into consideration, if a first LIP task issues a multi-processor control instruction to a second LIP task, and if the second LIP task is not running on the corresponding PIP, the multi-processor control instruction issued by the first LIP task cannot be completed. The OS running on the first LIP is therefore required to enter a standby state until the second LIP task becomes active or the control is required to be transferred to VMCP. An occurrence of such an event that the OS running on the first LIP task enters a standby state until the second LIP task becomes active or the control is transferred to VMCP, results in an overhead of the OS running on the first LIP task and issued the multi-processor control instruction and a delayed response of the OS. As a result, an overhead of the OS on VM and an overhead of VXCP result in a delayed response of VX. Such an overhead is one cause of a degraded performance of VM not negligible. One of the present applicants discloses related art in JP-A-6-187,178 which is published on Jul. 8, 1994, but not intended as prior art.

SUMMARY OF THE INVENTION

An object of the present invention is to provide a virtual machine system capable of considerably improving its performance by preventing a variation of RTIMSLC values of LIP tasks and strictly ensuring the concurrent running of a plurality of LIP tasks belonging to the same LPAR task.

The above object of the invention can be achieved in accordance with the following aspect. A VM scheduler of VMCP executing a dispatch of a LIP task is provided with an additional control function of storing RTIMSLC in an LPAR task to which each LIP task belongs and managing RTIMSLC. In calculating a residual time of a running termination time of a LIP task for the update of RTIMSLC, a result of a subtraction of the LIP task running time divided by the number of LIP tasks defined in the LPAR task from the residual time is used as a new residual time. When each LIP task is dispatched, RTIMSLC stored in the LPAR task is set to a timer of PIP as a running available residual time of each LIP task.

According to the present invention, it becomes possible to strictly ensure that a variation of running termination times and timings of a plurality of LIP tasks belonging to the same LPAR task is minimized, to considerably reduce an overhead of OS of a virtual machine system of a multi-processor structure having a plurality of logical CPUs, the overhead being caused by an absence of a logical CPU during communications to and synchronization with another logical CPU, and to considerably improve the performance of the virtual machine system of a multi-processor structure having a plurality of logical CPUs.

DESCRIPTION OF THE PREFERRED EMBODIMENTS

A method of controlling a virtual machine running time for a virtual machine system according to an embodiment of the invention will be described with reference to the accompanying drawings.

Figure 5:
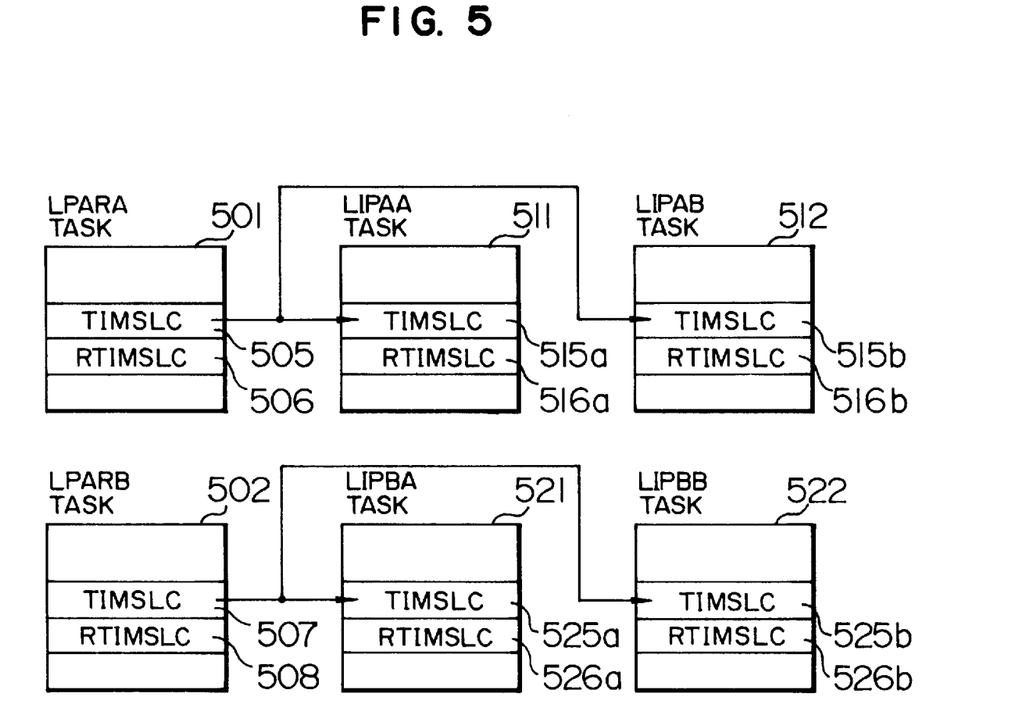
FIG. 5 is a diagram showing the control structure of a virtual machine system constituted by a plurality of logical CPUs embodying the present invention.

FIG. 5 shows the relationship between an LPAR task group and an LIP task group of the invention generated by VMCP in a software manner. Namely, VMCP generates an LPARA task 501, an LPARB task 502, an LIPAA task 511, an LIPAB task 512, an LIPBA task 521, and an LIPBB task 522. VMCP generates the two LPAR tasks when LPAR definition parameters are inputted from an external device, and generates the four LIP tasks when LIP definition parameters and commands are inputted from the external device in correspondence with the two LPARs. TIMSLC for each LPAR is contained in the LPAR definition parameters, and stored in a task control block of each LPAR task when the LPAR definition parameters are inputted. In FIG. 5, TIMSLC for the LPARA task 501 is TIMSLC 505, and TIXSLC for the LPARB task 502 is TIMSLC 507. TIMSLC for each LIP is contained in the LPAR definition parameters and commands, and stored in a task control block of each LIP task when the LPAR definition parameters and commands are inputted. In FIG. 5, TIMSLC 505 for the LPARA task 501 is transferred to a task control block of the LIPAA task 511 as TIMSLC 515a and to a task control block of the LIPAB task 512 as TIMSLC 515b, when the LIP definition parameters and commands are inputted. TIMSLC 507 for the LPARB task 502 is transferred to a task control block of the LIPBA task 521 as TIMSLC 525a and to a task control block of the LIPBB task 522 as TIMSLC 525b, when the LIP definition parameters and commands are inputted. In FIG. 5, the value of RTIMSLC 516a in a task control block of the LIPAA task 511 and the value of RTIMSLC 506 in a task control block of the LPARA task 501 indicate the time allowing the LIPAA task 511 to run on PIPA 102. The initial value of this value is the same as TIXSLC 515a and TIMSLC 505. The running time from when the LIPAA task 511 is activated to run on PIPA 102 to when the control is transferred to VMCP because of an interrupt or interception, is subtracted from the value of RTIMSLC 506, and the result is again stored in the areas of RTIMSLC 516a and RTIMSLC 506. That is to say, the values of RTIMSLC 516a and RTIMSLC 506 indicate the residual running time of the time slice assigned to the LIPAA task 511. The LIPAA task 511 can run on PIPA until the values of RTIMSLC 516a and RTIMSLC 506 become "0". When the values of RTIMSLC 516a and RTIMSLC 506 become "0", the LIPAA task 511 stops running on PIPA 102 under the control of VXCP until the values of RTIMSLCs of all other LIP tasks become "0". When the values of RTIMSLCs of all other LIP tasks become "0", the value of TIMSLC 515a in the task control block of the LIPAA task 511 is set to RTIMSLC 516a to initialize the latter and the value of TIMSLC 505 in the task control block of the LPARA task 501 is set to RTIMSLC 506 to initialize the latter. The LIPAA task 511 stopped its running again starts running on PIPA 102 under the control of VMCP, by using the initialized RTIMSLC 516a and RTIMSLC 506. The same function of RTIMSLC 516a and RTIMSLC 406 of the LIPAA task 511 is assigned also to RTIMSLC 516b and RTIMSLC 506 of the LIPAB task 512, RTIMSLC 526a and RTIMSLC 508 of the LIPBA task 521, and RTIMSLC 526b and RTIMSLC 508 of the LIPBB task 522.

Figure 6:
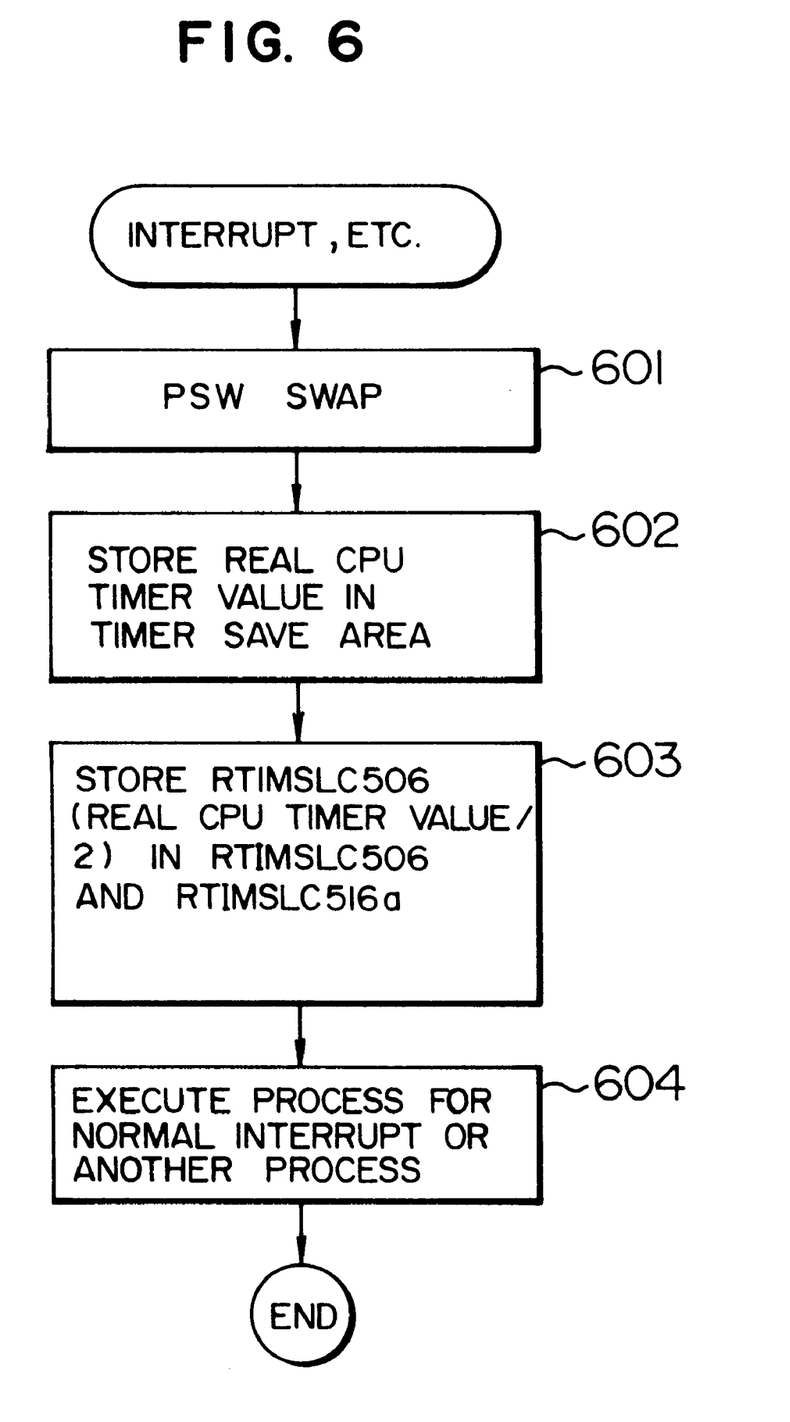
FIG. 6 is a flow chart explaining an interrupt process embodying the present invention.
Figure 7:
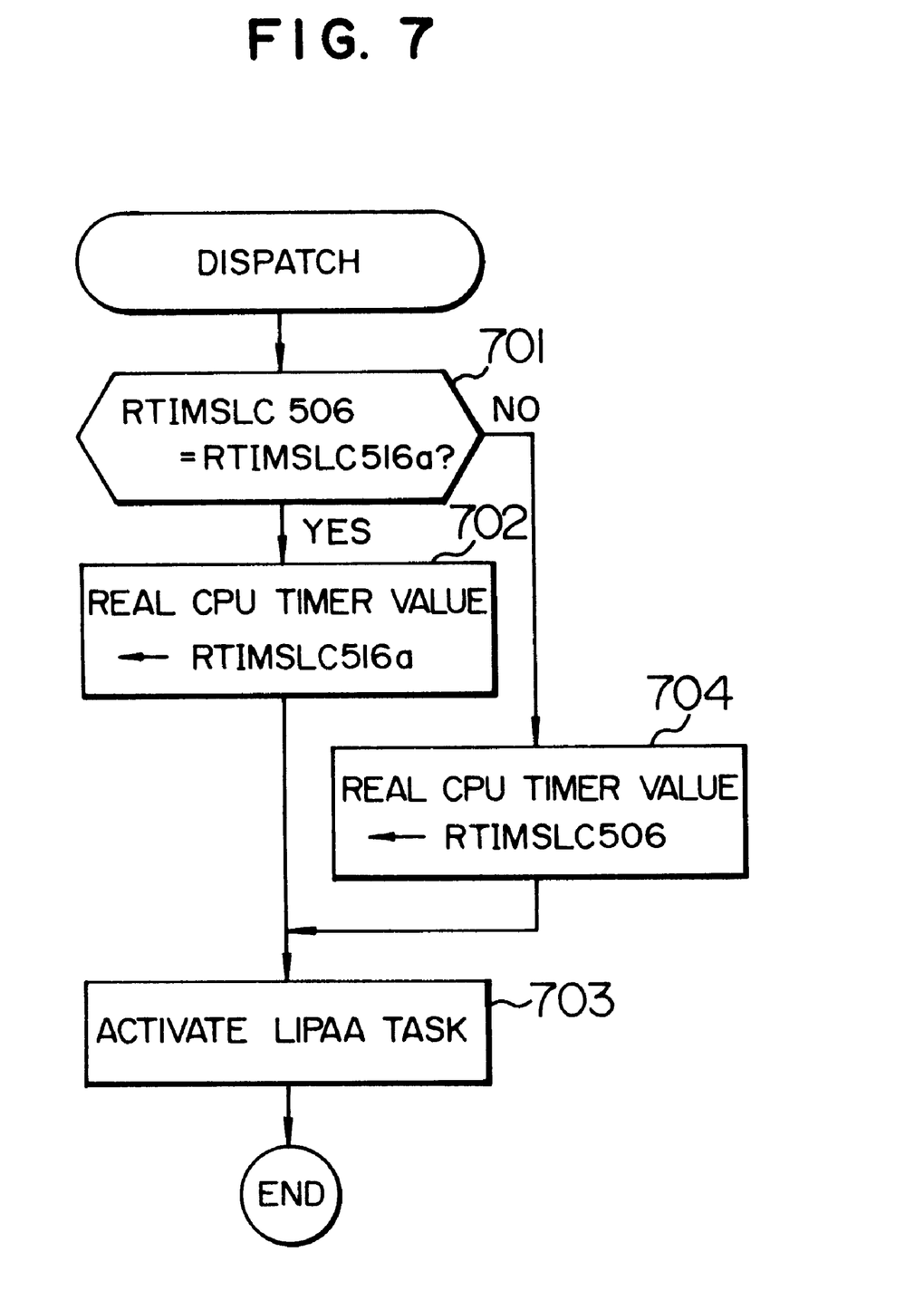
FIG. 7 is a flow chart explaining a dispatch process of logical CPUs embodying the present invention.

Next, how RTIMSLC is processed when the control is transferred from each LIP task to VMCP or from VMCP to each LIP will be described with reference to FIGS. 6 and 7. In FIGS. 6 and 7, it is assumed that the control transfer is performed between VMCP and the LIPAA task 511. Referring to FIG. 6, the control is transferred from the LIPAA task 511 to VMCP when an event occurs such as a timer interrupt of TSEND, an interception, and an LIP standby state. This control transfer is effected by switching program status words PSW of VMCP in response to an interrupt or by replacing PSW of V in response to an interception (601). Prior to executing a corresponding process for the interrupt or interception, VMCP to which the control has been transferred in response to the event, stores a real CPU timer value of the real machine in a timer save area corresponding to the LIPAA task 511 (602). Thereafter, VMCP subtracts the real CPU timer value of the real machine by 2 from RTIMSLC 506, and the result is stored in RTIMSLC 506 and RTIMSLC 516a (603). Thereafter, the process for the interrupt or interception is performed (604). Division by 2 of the real CPU timer value of the real machine means to divide the real CPU timer value of the real machine by the number of all LIPs constituting LPAR. During this process, the residual time slice value of LPAR is held in RTIMSLC 506 and RTIMSLC 516a. FIG. 7 explains a dispatch of the LIPAA task 511 by VMCP and a control transfer from VMCP to the LIPAA task 511. Prior to activating the LIPAA task 511, VMCP compares the contents of RTIMSLC 506 with RTIMSLC 516a (701). If RTIMSLC 506 and RTIMSLC 516a have the same contents, RTIMSLC 516a is set to the real CPU timer in the real machine (702), and thereafter activates the LIPAA task 511 (703). If RTIMSLC 506 and RTIMSLC 516a have different contents, RTIMSLC 506 is set to the real CPU timer of the real machine (704), and thereafter activates the LIPAA task 511 (703). Specifically, if the value of RTIMSLC 506 has been updated by another LIP task while the LIPAA task 511 suspends, the contents of RTIMSLC 506 indicating the new updated time slice value are used for the LIPAA task 511.

Figure 8A:
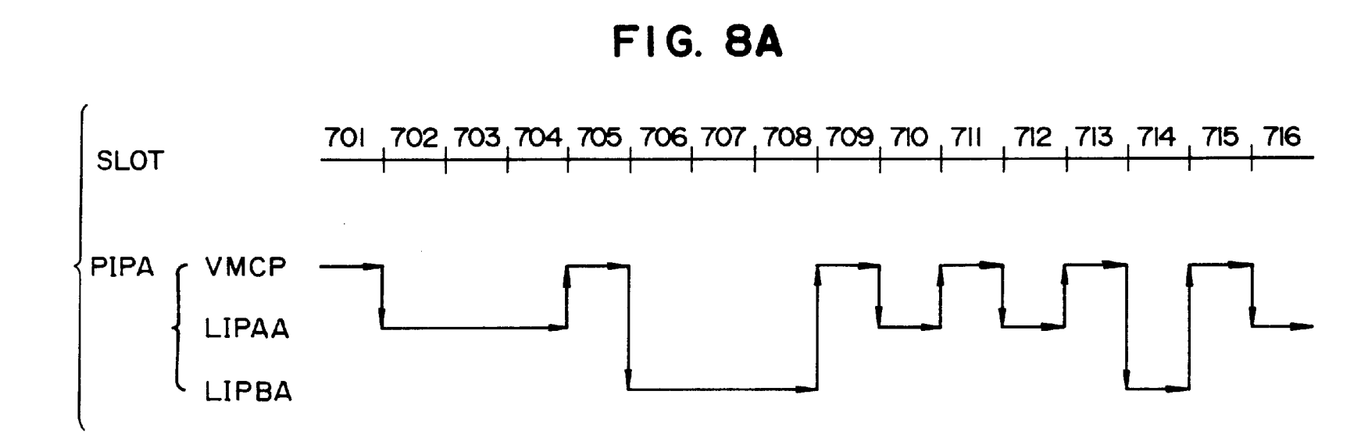
FIG. 8 is a timing chart showing the transition of an operation state of logical CPUs embodying the present invention.
Figure 8B:
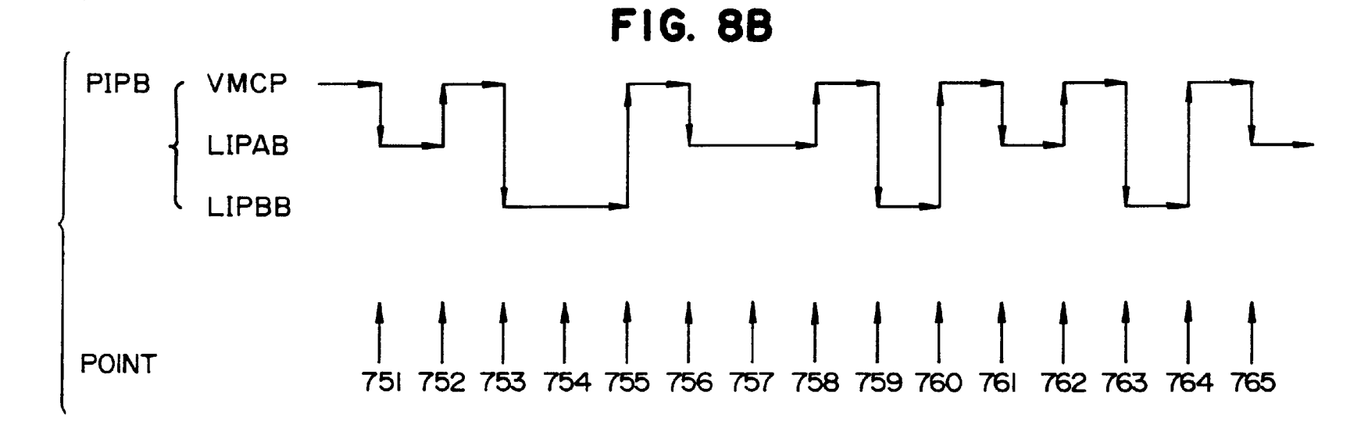

Referring next to FIG. 8, the running states of VMCP, LIPAA, LIPAB, LIPBA, and LIPBB of this embodiment will be described time sequentially. FIG. 8 is a timing chart illustrating a distribution of real machine resources to VMCP, LIPAA task 511, LIPAB task 512, LIPBA task 521, and LIPBB task 522 when VMCP and each LIP are dispatched to run on PIP. In this timing chart, the LIPAA task 511 and LIPBA task 521 are fixedly assigned to PIPA, and the LIPAB task 521 and LIPBB task 522 are fixedly assigned to PIPB.

Slot 701: VMCP running on PIPA and PIPB at the slot 701 has already transferred TIMSLC 505 stored in the LPARA task 501 to the LIPAA task 511 as TIMSLC 515a and to the LIPAB task 512 as TIMSLC 515b. Similarly, VMCP has already transferred TIMSLC 507 stored in the LPARB task 502 to the LIPBA task 521 as TIMSLC 525a and to the LIPBB task 522 as TIMSLC 525b. Furthermore, RTIMSLC 516a of the LIPAA task 511 has been initialized to TIMSLC 515a, RTIMSLC 516b of the LIPAB task 512 has been initialized to TIMSLC 515b, RTIMSLC 526a of the LIPBA task 521 has been initialized to TIMSLC 525a, and RTIMSLC 526a of the LIPBB task 522 has been initialized to TIMSLC 525a. VMCP sets the running termination times RTIMSLC 516a and RTIMSLC 516b of the LIPAA task 511 and LIPAB task 512 to the internal timers of PIPA and PIPB, and thereafter, activates the LIPAA task 511 and LIPAB task 512 to run on PIPA and PIPB (at point 751). At this point, the operations of PIPA and PIPB are moved to a slot 702.

Slot 702: At the slot 702, the LIPAA task 511 and LIPAB task 512 run while the internal timers of PIPA and PIPB set at the slot 701 are being updated. During the execution at the slot 702, if an event such as an interrupt other than the timer interrupt indicating an end of the operation termination time (hereinafter called a time slice end or TSEND), interception, and LIP standby is issued to the LIPAB task 512 running on PIPB, the operation thereof is stopped, and the control is transferred to VMCP (at point 752). At this point 752, the operation of the LIPAA task 511 running on PIPA continues. When the control of PIPB is transferred to VMCP, the operations of PIPA and PIPB are moved to a slot 703.

Slot 703: At the slot 703, VMCP running on PIPB stores an updated value of the internal timer of PIPB set at the slot 701 in the LPARA task as RTIMSLC 506 and in the LIPAB task 512 as RTIMSLC 516b. The stored value indicates the result of a subtraction of the real CPU timer value in the real machine divided by 2 from RTIMSLC 506. The stored value in RTIMSLC 506 and RTIMSLC 516b indicates a residual time of the operation termination time of the LIPAB task 512. At the slot 703, similar to the slot 701, VMCP sets the operation termination time RTIMSLC 526b of the LIPBB task 522 to the internal timer of PIPB, and thereafter activates the LIPBB task 522 to run on PIPB. At the slot 703, the operation of the LIPAA task 511 running on PIPA continues from the slot 702, and the LIPBB task 522 is activated to run on PIPB (at point 753). At this point, the operations of PIPA and PIPB are moved to a slot 704.

Slot 704: During the execution at the slot 704, if an event such as an interrupt other than the timer interrupt of TSEND, interception, and LIP standby is issued to the LIPAA task 511 running on PIPA, the operation thereof is stopped, and the control is transferred to VMCP. At this point, the operation of the LIPBB task 522 running on PIPB continues (at point 754). When the control is transferred to VMCP, the operations of PIPA and PIPB are moved to a slot 705.

Slot 705: At the slot 705, VMCP running on PIPA stores an updated value of the internal timer of PIPA set at the slot 701 in the LPARA task as RTIMSLC 506 and in the LIPAA task 511 as RTIMSLC 516a. The stored value indicates the result of a subtraction of the real CPU timer value in the real machine divided by 2 from RTIMSLC 506 updated at the slot 703. The stored value in RTIMSLC 506 and RTIMSLC 516a indicates a residual time of the operation termination time of the LIPAA task 511. At the slot 705, similar to the slot 701, VMCP sets the operation termination time RTIMSLC 526a of the LIPBA task 521 to the internal timer of PIPA, and thereafter activates the LIPBA task 521 to run on PIPA. During the execution at the slot 705, if an event such as an interrupt other than the timer interrupt of TSEND, interception, and LIP standby is issued to the LIPBB task 522 running on PIPB, the operation thereof is stopped, and the control is transferred to VMCP (at point 755). At this point, the operations of PIPA and PIPB are moved to a slot 706.

Slot 706: At the slot 706, VMCP running on PIPB stores an updated value of the internal timer of PIPB set at the slot 703 in the LPARB task as RTIMSLC 508 and in the LIPBB task 522 as RTIMSLC 526b. The stored value indicates the result of a subtraction of the real CPU timer value in the real machine divided by 2 from RTIMSLC 508. The stored value in RTIMSLC 508 and RTIMSLC 526b indicates a residual time of the operation termination time of the LIPBB task 522. At the slot 706, similar to the slot 703, VMCP sets the operation termination time RTIMSLC 516b or RTIMSLC 506 of the LIPAB task 512 to the internal timer of PIPB, and thereafter activates the LIPAB task 512 to run on PIPB. At the slot 706, the operation of the LIPBA task 521 running on PIPA continues from when it was activated at the slot 705, and the LIPAB task 512 is activated to run on PIPB (at point 756). At this point, the operations of PIPA and PIPB are moved to a slot 707.

Slot 707: At the slot 707, the operation of the LIPBA task 521 running on PIPA continues, and also the operation of the LIPAB task 512 running on PIPB continues (at point 757). At this point, the operations of PIPA and PIPB are moved to a slot 708.

Slot 708: During the execution at the slot 708, if an event such as an interrupt other than the timer interrupt of TSEND, interception, and LIP standby is issued to the LIPBA task 521 running on PIPA, the operation thereof is stopped, and the control is transferred to VMCP. At the same time, if an event such as an interrupt other than the timer interrupt of TSEND, interception, and LIP standby is issued to the LIPAB task 512 running on PIPB, the operation thereof is stopped, and the control is transferred to VMCP (at point 758). At this point, the operations of PIPA and PIPB are moved to a slot 709.

Slot 709: At the slot 709, VMCP running on PIPA stores an updated value of the internal timer of PIPA set at the slot 705 in the LPARA task as RTIMSLC 506 and in the LIPBA task 521 as RTIMSLC 526a. The stored value indicates the result of a subtraction of the real CPU timer value in the real machine divided by 2 from RTIMSLC 506 updated at the slot 705. The stored value in RTIMSLC 506 and RTIMSLC 526a indicates a residual time of the operation termination time of the LIPBA task 521. At the slot 709, similar to the slot 705, VMCP sets the operation termination time RTIMSLC 516a or RTIMSLC 508 of the LIPAA task 511 to the internal timer of PIPA, and thereafter activates the LIPAA task 511 to run on PIPA. Similarly, at the slot 709, VMCP running on PIPB stores an updated value of the internal timer of PIPB set at the slot 703 in the LPARA task as RTIMSLC 506 and in the LIPAB task 512 as RTIMSLC 516b. The stored value indicates the result of a subtraction of the real CPU timer value in the real machine divided by 2 from RTIMSLC 506. The stored value in RTIMSLC 506 and RTIMSLC 516b indicates a residual time of the operation termination time of the LIPAB task 512. At the slot 709, similar to the slot 706, VMCP sets the operation termination time RTIMSLC 526b or RTIMSLC 508 of the LIPBB task 522 to the internal timer of PIPB, and thereafter activates the LIPBB task 522 to run on PIPB (at point 759). At this point, the operations of PIPA and PIPB are moved to a slot 710.

Slot 710: At the slot 710, when it becomes the operation termination time of the LIPAA task 511 running on PIPA, the operation thereof is stopped in response to the timer interrupt of TSEND, and the control is transferred to VMCP. During the execution at the slot 710, if an event such as an interrupt other than the timer interrupt of TSEND, interception, and LIP standby is issued to the LIPBB task 522 running on PIPB, the operation thereof is stopped, and the control is transferred to VMCP (at point 760). At this point, the operations of PIPA and PIPB are moved to a slot 711.

Slot 711: At the slot 711, VMCP running on PIPA stores an updated value of the internal timer of PIPA set at the slot 709 in the LPARA task as RTIMSLC 506 and in the LIPAA task 511 as RTIMSLC 516a. The stored value indicates the result of a subtraction of the real CPU timer value in the real machine divided by 2 from RTIMSLC 506 updated at the slot 709. The stored value in RTIMSLC 506 and RTIMSLC 516a indicates a residual time of the operation termination time of the LIPAA task 511. Therefore, the stored value of RTIMSLC 506 and RTIMSLC 516a may take a value other than "0" in some cases although the operation of the LIPAA 511 was stopped in response to the timer interrupt of TSEND issued to VMCP. Similarly, at the slot 711, VMCP running on PIPB stores an updated value of the internal timer of PIPB set at the slot 709 in the LPARA task as RTIMSLC 508 and in the LIPAB task 512 as RTIMSLC 516b. The stored value indicates the result of a subtraction of the real CPU timer value in the real machine divided by 2 from RTIMSLC 506. The stored value in RTIMSLC 506 and RTIMSLC 516b indicates a residual time of the operation termination time of the LIPAB task 512. Thereafter, at the slot 711, similar to the slot 709, VMCP sets the operation termination time RTIMSLC 516a or RTIMSLC 506 of the LIPAA task 511 to the internal timer of PIPA, and thereafter activates the LIPAA task 511 to run on PIPA. Furthermore, at the slot 711, similar to the slot 709, VMCP sets the operation termination time RTIMSLC 516b or RTIMSLC 506 of the LIPAB task 512 to the internal timer of PIPB, and thereafter activates the LIPAB task 512 to run on PIPB (at point 761). At this point, the operations of PIPA and PIPB are moved to a slot 712.

Slot 712: At the slot 712, when it becomes the operation termination time of the LIPAA task 511 running on PIPA, the operation thereof is stopped in response to the timer interrupt of TSEND issued to VMCP, and the control is transferred to VMCP. During the execution at the slot 712, when it becomes the operation termination time of the LIPAB task 512 running on PIPB, the operation thereof is stopped in response to the timer interrupt of TSEND issued to VMCP, and the control is transferred to VMCP (at point 762). At this point, the operations of PIPA and PIPB are moved to a slot 713.

Slot 713: At the slot 713, VMCP running on PIPA stores an updated value of the internal timer of PIPA set at the slot 711 in the LPARA task as RTIMSLC 506 and in the LIPAA task 511 as RTIMSLC 516a. The stored value indicates the result of a subtraction of the real CPU timer value in the real machine divided by 2 from RTIXSLC 506 updated at the slot 711. The stored value in RTIMSLC 506 and RTIMSLC 516a indicates a residual time of the operation termination time of the LIPAA task 511. In this example, the operation of the LIPAA task 511 is stopped in response to the timer interrupt of TSEND issued to VMCP, and the stored value of RTIMSLC 506 and RTIMSLC 516a is "0". Similarly, at the slot 713, VMCP running on PIPB stores an updated value of the internal timer of PIPB set at the slot 711 in the LPARA task as RTIMSLC 508 and in the LIPAB task 511 as RTIMSLC 516b. The stored value indicates the result of a subtraction of the real CPU timer value in the real machine divided by 2 from RTIMSLC 506 updated at the slot 711. The stored value in RTIMSLC 506 and RTIMSLC 516b indicates a residual time of the operation termination time of the LIPAB task 512. In this example, the operation of the LIPAB task 512 is stopped in response to the timer interrupt of TSEND issued to VMCP, and the stored value of RTIMSLC 506 and RTIMSLC 516b is "0". Thereafter, at the slot 713, similar to the slot 711, VMCP sets the operation termination time RTIMSLC 526a or RTIMSLC 508 of the LIPBA task 521 to the internal timer of PIPA, and then activates the LIPBA task 521 to run on PIPA. The LIPBA task 521 is selected at this slot because the value of RTIMSLC 516a corresponding to the LIPAA task 511 is "0". Furthermore, VMCP sets the operation termination time RTIMSLC 526b or RTIMSLC 508 of the LIPBB task 522 to the internal timer of PIPB, and then activates the LIPBB task 522 to run on PIPB (at point 763). The LIPBB task 522 is selected at this slot because the value of RTIMSLC 516b corresponding to the LIPAB task 512 is "0". At this point, the operations of PIPA and PIPB are moved to a slot 714.

Slot 714: At the slot 714, when it becomes the operation termination time of the LIPBA task 521 running on PIPA, the operation thereof is stopped in response to the timer interrupt of TSEND issued to VMCP, and the control is transferred to VMCP. During the execution at the slot 714, when it becomes the operation termination time of the LIPBB task 522 running on PIPB, the operation thereof is stopped in response to the timer interrupt of TSEND issued to VMCP, and the control is transferred to VMCP (at point 764). At this point, the operations of PIPA and PIPB are moved to a slot 715.

Slot 715: At the slot 715, VMCP running on PIPA stores an updated value of the internal timer of PIPA set at the slot 713 in the LPARA task as RTIMSLC 508 and in the LIPBA task 521 as RTIMSLC 526a. The stored value indicates the result of a subtraction of the real CPU timer value in the real machine divided by 2 from RTIMSLC 508 updated at the slot 711. The stored value in RTIMSLC 508 and RTIMSLC 526a indicates a residual time of the operation termination time of the LIPBA task 521. In this example, the operation of the LIPBA task 521 is stopped in response to the timer interrupt of TSEND issued to VMCP, and the stored value of RTIMSLC 508 and RTIMSLC 526a is "0". Similarly, at the slot 715, VMCP running on PIPB stores an updated value of the internal timer of PIPB set at the slot 711 in the LPARA task as RTIMSLC 508 and in the LIPBB task 522 as RTIMSLC 526b. The stored value indicates the result of a subtraction of the real CPU timer value in the real machine divided by 2 from RTIMSLC 508. The stored value in RTIXSLC 508 and RTIMSLC 526b indicates a residual time of the operation termination time of the LIPBB task 522. In this example, the operation of the LIPBB task 522 is stopped in response to the timer interrupt of TSEND issued to VMCP, and the stored value of RTIMSLC 508 and RTIMSLC 526b is "0". At this time, the value of RTIMSLC 516a corresponding to the LIPAA task 511 is "0", the value of RTIMSLC 516b corresponding to the LIPAB task 512 is "0", the value of RTIMSLC 526a corresponding to the LIPBA task 521 is "0", and the value of RTIMSLC 526b corresponding to the LIPBB task 522 is "0". Therefore, each LIP task is activated thereafter in the manner similar to the slot 701. Specifically, VMCP running on PIPA and PIPB transfers TIMSLC 505 stored in the LPARA task 501 to the LIPAA task 511 as TIMSLC 515a and to the LIPAB task 512 as TIMSLC 515b. Similarly, VXCP transfers TIMSLC 507 stored in the LPARB task 502 to the LIPBA task 521 as TIMSLC 525a and to the LIPBB task 522 as TIMSLC 525b. Furthermore, RTIMSLC 516a in the LIPAA task 511 is initialized to TIMSLC 515a, RTIMSLC 516b in the LIPAB task 512 is initialized to TIMSLC 515b, RTIMSLC 526a in the LIPBA task 521 is initialized to TIMSLC 525a, and RTIMSLC 526a in the LIPBB task 522 is initialized to TIMSLC 525b. VMCP sets the operation termination times RTIMSLC 516a and 516b of the LIPAA task 511 and LIPAB task 512 to the internal timers of PIPA and PIPB, and thereafter activates the LIPAA task 511 and LIPAB task 512 to run on PIPA and PIPB (at point 756). At this point, the operations of PIPA and PIPB are moved to a slot 716. The operations at the slot 716 and following slots are similar to the slots 702 and following slots.

With the conventional technique as explained with FIG. 4, the LIPAA task 311 belonging to the LPARA task 301 has the time slice end at the point 454, whereas the LIPAB task 312 belonging to the same LPARA task 301 has the time slice end at the point 456. There is a large shift between the two points. Furthermore, the LIPBA task 321 belonging to the LPARB task 302 has the time slice end at the point 457, whereas the LIPBB task 322 belonging to the same LPARB task 302 has the time slice end at the point 459. There is also a large shift between the two points.

In contrast with the conventional technique, with this embodiment, the LIPAA task 511 and LIPAB task 512 belonging to the LPARA task 501 have the time slice end at the same point 762, and also the LIPBA task 521 and LIPBB task 522 belonging to the LPARB task 502 have the time slice end at the same point 764. This means that the plurality of LIP tasks belonging to one LPAR task are synchronized better than the conventional technique.

What is claimed is:

1. A virtual machine system comprising:

at least two physical central processing units;

a main storage shared by said physical central processing units;

a plurality of virtual machines configured on said physical central processing units, each virtual machine including at least two logical central processing units; and a virtual machine control program having a scheduler which dispatches VM tasks to the virtual machines including LIP tasks to the logical central processing units in the virtual machines, stores in each VM task a residual running time value set to a timer of a physical central processing unit for each LIP task included in the VM task, calculates an updated residual running time value by subtracting the LIP task running time divided by the number of LIP tasks defined in the VM task, and stores the updated residual running time value in the VM task to which each LIP task belongs.

* * * * *